United States Patent
Singh

(10) Patent No.: US 7,102,809 B2
(45) Date of Patent: Sep. 5, 2006

(54) ACOUSTIC-OPTIC DEVICES UTILIZING TELLURIUM CRYSTALS

(75) Inventor: Narsingh B. Singh, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/896,175

(22) Filed: Jul. 22, 2004

(65) Prior Publication Data

US 2006/0018002 A1   Jan. 26, 2006

(51) Int. Cl.
  *G02F 1/33* (2006.01)
  *G02F 1/11* (2006.01)
(52) U.S. Cl. .................. 359/305; 359/285; 359/308
(58) Field of Classification Search ........ 359/285–287, 359/305–314
  See application file for complete search history.

(56) References Cited

U.S. PATENT DOCUMENTS 3,882,273 A * 5/1975 Knox .......................... 348/198
3,906,500 A * 9/1975 Redman ...................... 342/167
3,944,948 A * 3/1976 Redman et al. ............. 359/285
3,962,657 A * 6/1976 Redman et al. ............. 359/285
4,639,092 A * 1/1987 Gottlieb et al. ............. 359/308
4,663,961 A * 5/1987 Nelson et al. ............... 73/24.02
4,700,045 A * 10/1987 Merry et al. ............. 219/121.78
4,955,699 A * 9/1990 Singh et al. ................. 359/285
5,396,243 A * 3/1995 Jalink et al. .................. 342/54
5,504,615 A    4/1996 Singh et al. ................. 359/285
6,307,665 B1 * 10/2001 Kim et al. .................... 359/311

OTHER PUBLICATIONS

Fukuda et al. "Acoustooptic Interaction in Piezoelectric Semiconductor: Tellurium", IEEE, 1979, Proceedings of the 1979 Ultrasonics Symposium, pp. 9-17.*

* cited by examiner

Primary Examiner—David N. Spector
(74) Attorney, Agent, or Firm—Birch, Stewart, Kolasch & Birch, LLP

(57) ABSTRACT

Acoustic-optic devices which use a crystal of tellurium into which is launched acoustic shear waves by a lithium niobate transducer in accordance with an input RF signal. Tellurium used in the devices exhibits a figure of merit in the range of around 5,000 to 10,000.

6 Claims, 2 Drawing Sheets

ACOUSTIC-OPTIC DEVICES UTILIZING TELLURIUM CRYSTALS

BACKGROUND OF THE INVENTION

1. Field of the Invention

The invention in general relates to acoustic-optic devices and particularly to acoustic-optic devices with a crystal which imparts higher efficiency to the devices.

2. Description of Related Art

Acoustic-optic devices such as AOTFs (acoustic-optic tunable filters), delay lines, RF spectrum analyzers and laser beam scanners utilize a particular crystal to which is coupled an acoustic transducer. An RF signal applied to the transducer produces an acoustic wave in the crystal which is used to modify light in some manner, projected through the crystal. The term "light" as used herein is meant to apply to radiation of a particular wavelength, not necessarily in the visible portion of the electromagnetic spectrum.

Associated with the crystal is a figure of merit $M_2$ defined by, $$M_2 = n^6 \times p^2 / v^2 \times \rho$$

Where: n is the refractive index of the crystal; p is the photoelastic coefficient; v is acoustic velocity in the crystal; and $\rho$ is the density of the crystal Basically, the higher the figure of merit $M_2$, the higher will be the efficiency of the device. For example, in an AOTF, higher efficiency enables higher resolution with lower power requirements. Thus, better and brighter images may be obtained at low power.

The present invention provides for an acoustic-optic device which utilizes a crystal of tellurium, resulting in a figure of merit far greater than current devices.

SUMMARY OF THE INVENTION

Acoustic-optic devices are described which use a tellurium crystal. The tellurium crystal is hardened by doping with a small amount of silver. A transducer such as lithium niobate is used to launch shear waves into the tellurium crystal to interact with input radiation. Devices made with the tellurium crystal include acousto-optic delay lines, acousto-optic filters, RF spectrum analyzers and acousto-optic two-dimensional laser beam scanners.

Further scope of applicability of the present invention will become apparent from the detailed description provided hereinafter. It should be understood, however, that the detailed description and specific example, while disclosing the preferred embodiment of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only, and wherein.

DESCRIPTION OF THE PREFERRED EMBODIMENT

A. Crystal Preparation

The tellurium crystal used in the devices to be described may preferably be made by the well-known Bridgman growth process. Prior to such growth, tellurium is initially purified by placing tellurium powder in a quartz tube which is evacuated and sealed under vacuum conditions. The powder is melted at an elevated temperature and any impurities are driven to one end of the tube. The material is directionally solidified by moving the tube through a cooler temperature after which both ends of the solid tellurium are removed.

After this initial purification, the solid tellurium is placed in a sealed quartz tube for Bridgman growth in which a capillary or oriented and fabricated crystal may be used as the seed. Pure tellurium is relatively soft and tends to deform and accordingly a hardener may be added to make the tellurium more rigid. Such hardener may be a doping of silver in a ratio of 100 ppm with respect to the tellurium.

The sealed quartz tube with purified tellurium is placed in a two or three zone Bridgman furnace having a hot zone temperature of 550° C., with a temperature gradient of around 30K/cm used for crystal growth. The tube is translated, or moved, at a rate of around 2 cm/day until a desired length tellurium boule is created.

The resulting crystal is cut by a string saw into desired slabs which are polished for use in the devices. These tellurium crystals are not transparent in the visible wavelength region but do transmit light in the mid to far IR region, approximately 3.0 μm to 25 μm. Depending upon the orientation of the crystal, in a particular device such tellurium crystals exhibit an exceptionally high figure of merit $M_2$ of around 5,000 to 10,000. The following chart compares the figure of merit for various popular device crystals.

| MATERIALS | $M_2$ |
|---|---|
| Quartz | 1 |
| Lead molybdate | 30 |
| Gallium phosphide | 29 |
| Tellurium dioxide | 680 |
| Thallium arsenic sulfide | 1,000–2,800 |
| Tellurium | 5,000–10,000 |

In addition to its high figure of merit and resultant high efficiency, the thermal conductivity of the tellurium crystal is higher than other crystals used in the devices, thus enabling higher power applications.

B. Delay Lines for Signal Processing

Figure 1:
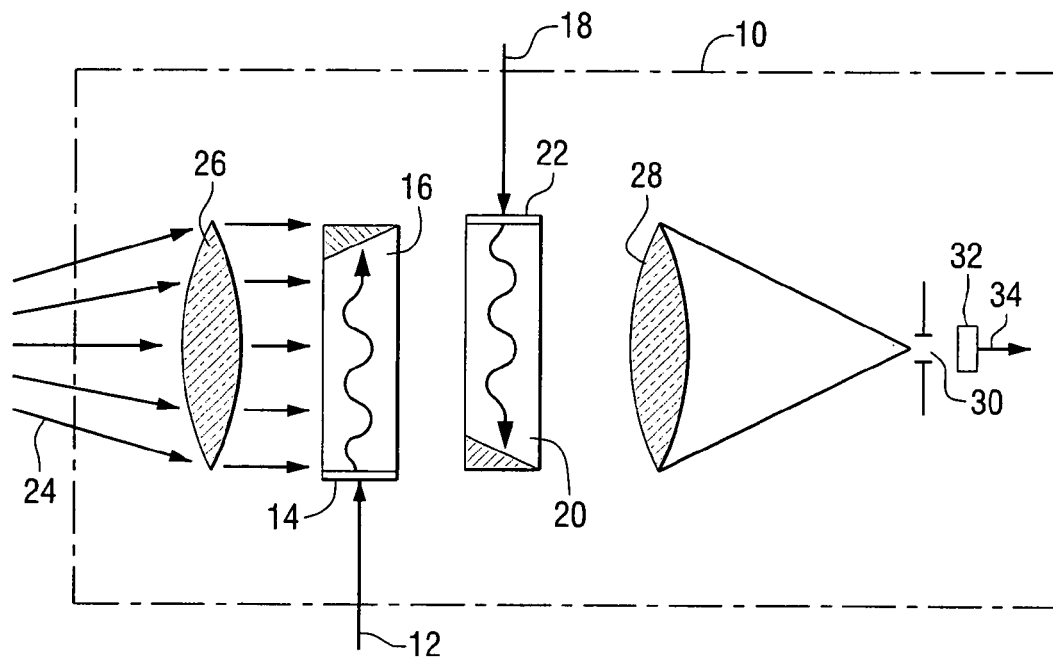
FIG. 1 is a diagram of an acoustic-optic delay line and signal processing system utilizing a tellurium crystal.

A typical application of acousto-optic delay lines in a signal processing unit 10 is shown in FIG. 1. In this system, a known signal waveform, such as a radar signal applied at input 12, is converted into an acoustic wave by the transducer 14, and propagates in the first acousto-optic cell, or delay line 16. A time reversed replica of this same signal is applied at input 18 and propagated as an acoustic wave in the second delay line 20 by means of transducer 22. Both delay lines 16 and 20 are tellurium crystals as previously described. A laser beam 24 is expanded and then directed by lens 26 to fill the aperture of these delay lines 16 and 20. The light that is modulated by this delay line pair is focused by lens 28 through aperture 30 onto a photo-detector 32. The optical signal 34 thus produced is the auto-correlation function of the signal, which has the property of detecting the signal with optimum signal to noise ratio.

C. AOTF

Figure 2:
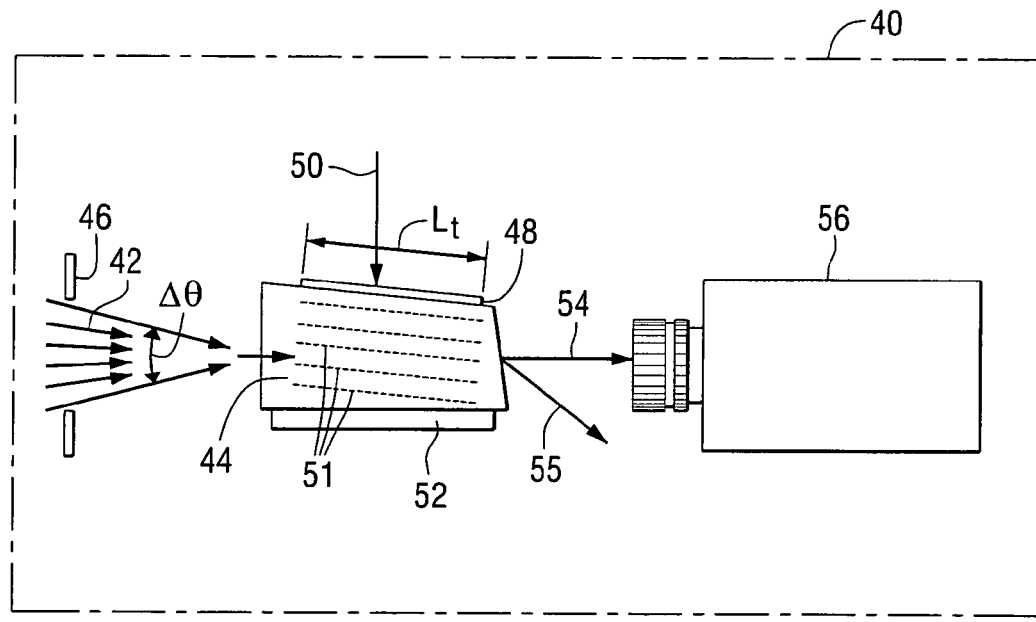
FIG. 2 is a diagram of an AOTF utilizing a tellurium crystal.

An acousto-optic tunable filter unit 40 is shown in FIG. 2. This device has the property of analyzing, or filtering, an incident beam of light 42 of unknown spectral composition, such as potential military targets or chemical agents, and under very different lighting conditions. The AOTF is particularly well adapted for use in hyperspectral imaging systems for target identification.

Light 42 enters the tellurium crystal 44 at its front face and is restricted to an angle θ by an aperture 46. A lithium niobate transducer 48 of length $L_t$ is bonded to the crystal 44 by means of a UV cured epoxy, by way of example. An RF signal applied to input 50 causes transducer 48 to launch shear waves 51 into crystal 44, where the acoustic shear waves 51 interact with the light entering the crystal and produce a diffraction of light of a certain wavelength, depending upon the frequency of the applied RF signal. In order to eliminate reflected acoustic waves, an acoustic absorber 52 such as lead, is bonded to the crystal 44 on a side opposite that of the transducer 48.

The tellurium crystal 44 is a birefringent crystal such that two refracted rays are produced from a single incident ray. Light emerging from crystal 44 may take two different paths 54 and 55. A detector may be placed for receiving the light along path 54 or 55. In FIG. 2 a detector such as camera 56 is positioned to analyze diffracted light along path 54. In such AOTF systems a polarizer arrangement at the crystal output is often used since shear wave interaction rotates the polarization by 90°. However, due to the large diffraction angles, and the objectionable insertion losses of the polarizers, angular separation is usually more effective and desirable.

D. RF Spectrum Analyzers

Figure 3:
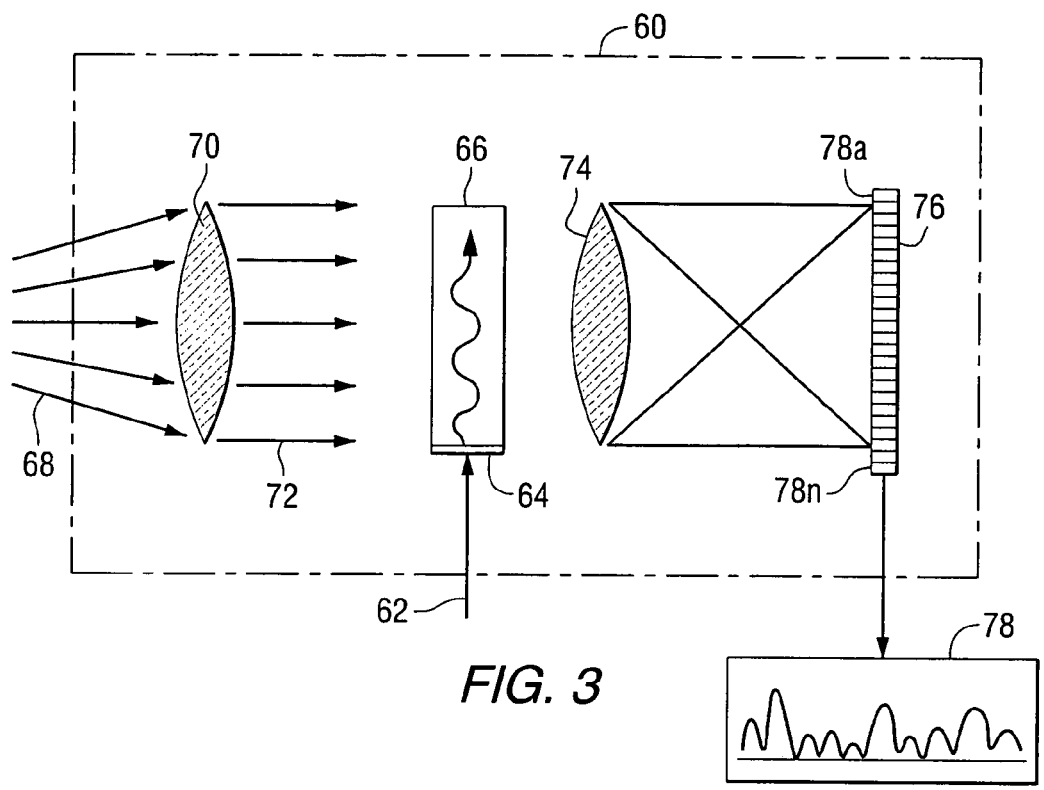
FIG. 3 is a diagram of an RF spectrum analyzer utilizing a tellurium crystal.

An acousto-optic RF spectrum analyzer 60 is shown in FIG. 3. In this system, an unknown RF signal applied at input 62 is analyzed by transforming it into an acoustic disturbance by the transducer 64 bonded to tellurium crystal 66. The crystal aperture is illuminated by a laser beam 68 which has passed through lens 70. The light 72 is diffracted in crystal 66 by the input signal's resulting acoustic disturbance and is focused by lens 74 onto a photo-detector array 76. Each frequency component of the input RF signal results in a diffraction of the light 72 to a different angle, such that the line falls on different elements 76a through 76n of the array 76. Thus, the readout of the array is the same as the frequency composition, or Fourier transform, of the unknown RF signal, as shown in box 78.

E. Two Dimensional Laser Beam Scanner

Figure 4:
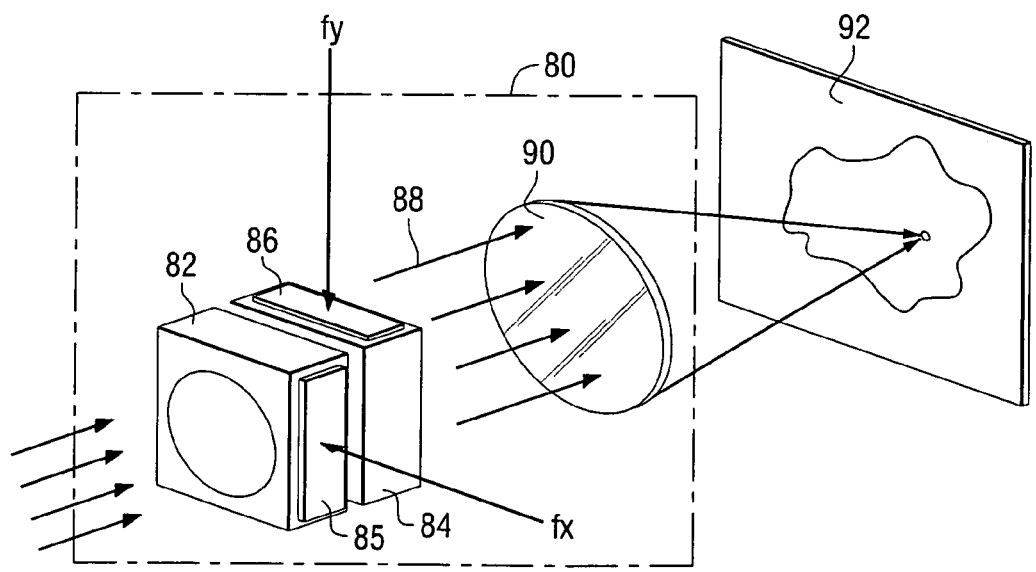
FIG. 4 is a diagram of a two dimensional laser beam scanner utilizing a tellurium crystal.

An acousto-optic, two-dimensional laser beam scanning system 80 is shown in FIG. 4. Such a system may be used to generate an image raster, such as for television, or for random access beam pointing as in laser radar. It consists of two acousto-optic cells 82 and 84 of tellurium crystals, with transducers 85 and 86 respectively on each cell, orthogonal relative to one another. This gives rise to the capability to independently select the X- and Y-beam directions, so that any point in a two-dimensional space can be accessed by selecting a chosen pair of acoustic frequencies $f_x$ and $f_y$. A beam 88 is emitted from cell 84 and focused by lens 90 onto a screen 92 or other display or sensing surface. This can be done in a raster, by linearly sweeping the X-axis, or random access by selecting X and Y frequency pairs. In the raster version, an image may be written by suitably controlling the intensity of the acoustic wave during the scanning process.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. An improved acousto-optic device of the type which utilizes at least one crystal wherein the crystal is comprised of tellurium including silver as a hardener.

2. The improved acousto-optic device of claim 1 wherein the hardener comprises silver.

3. The improved acousto-optic device of claim 1 wherein the crystal can transmit wavelengths between 3.5 and 25 μm.

4. The improved acousto-optic device of claim 1 wherein the acoustic-optic device is selected from the group consisting of acousto-optic delay lines, acousto-optic filters, RF spectrum analyzers and acousto-optic two-dimensional laser beam scanners.

5. The improved acousto-optic device of claim 4 wherein the acoustic-optic device is an acousto-optic tunable filter comprised of at least one tellurium crystal and a lithium niobate transducer.

6. An improved acousto-optic device of the type which utilizes a crystal comprised of tellurium and including silver as a hardener.

* * * * *